US010057352B2

(12) United States Patent
Gupta et al.

(10) Patent No.: US 10,057,352 B2
(45) Date of Patent: Aug. 21, 2018

(54) INTERNET OF EVERYTHING DEVICE RELAY DISCOVERY AND SELECTION

(71) Applicant: QUALCOMM Incorporated, San Diego, CA (US)

(72) Inventors: Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/846,630

(22) Filed: Sep. 4, 2015

(65) Prior Publication Data

US 2016/0269486 A1 Sep. 15, 2016

Related U.S. Application Data

(60) Provisional application No. 62/132,665, filed on Mar. 13, 2015.

(51) Int. Cl.
*H04B 7/204* (2006.01)
*H04B 7/14* (2006.01)
(Continued)

(52) U.S. Cl.
CPC ............... *H04L 67/12* (2013.01); *H04W 4/70* (2018.02); *H04W 72/0446* (2013.01);
(Continued)

(58) Field of Classification Search
CPC .... H04L 67/12; H04W 4/005; H04W 72/0446
(Continued)

(56) References Cited

U.S. PATENT DOCUMENTS 8,503,377 B2 8/2013 Cordeiro et al.
8,687,539 B2 * 4/2014 Tay ...................... H04W 40/22 370/246

(Continued)

FOREIGN PATENT DOCUMENTS

WO WO-2014153770 A1 10/2014

OTHER PUBLICATIONS

3GPP TR 23.703 : "3rd Generation Partnership Project; Technical Specification Group Services and System Aspects; Study on architecture enhancements to support Proximity-based Services (ProSe)", Version 1.1.0, Release 12, Jan. 2014, pp. 348.

(Continued)

*Primary Examiner* — Thai Hoang
(74) *Attorney, Agent, or Firm* — Qualcomm IP Dept.; James Hunt Yancey, Jr.

(57) ABSTRACT

Wireless communication systems and methods related to the discovery and selection of relay devices by internet of everything (IoE) devices are disclosed. For example, IoE devices with low pathloss to a base station can broadcast information during discovery frames that allow other IoE devices to discover them and select them as a relay, if appropriate. The discovery broadcast message from an IoE device can include information to allow a listening IoE device to select a suitable IoE device for relaying its data that satisfies latency parameters while minimizing the energy impact of relaying. Signaling structures are also provided to allow different IoE devices to select slots for broadcasting within the discovery frame in a distributed manner without disrupting existing periodic broadcasts. Other aspects, embodiments, and features are also claimed and described.

14 Claims, 11 Drawing Sheets

900
102a IoE Device
102b IoE Device
102c IoE Device
***
102*i* IoE Device
902 Discovery Message Broadcast During Slot *b* of Discovery Frame
904 Discovery Message Broadcast During Slot *c* of Discovery Frame
906 Discovery Message Broadcast During Slot *i* of Discovery Frame
Select Relay Device Based on the Received Discovery Messages 908
Associate with the Selected Relay Device 910
910b
910c
910*i*

(51) Int. Cl.
*H04L 29/08* (2006.01)
*H04W 72/04* (2009.01)
*H04W 4/70* (2018.01)
*H04W 88/04* (2009.01)

(52) U.S. Cl.
CPC ......... *H04W 88/04* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/21* (2018.01); *Y02D 70/22* (2018.01)

(58) Field of Classification Search
USPC ........................ 370/311, 315–326; 455/7–24
See application file for complete search history.

(56) References Cited

U.S. PATENT DOCUMENTS

2009/0036052 A1* 2/2009 Miyanaga .............. H04B 7/022 455/18
2009/0061767 A1* 3/2009 Horiuchi ................ H04B 7/155 455/18
2010/0177756 A1 7/2010 Choi et al.
2011/0249195 A1* 10/2011 Teranuma ............. G06F 1/3203 348/730
2011/0256828 A1* 10/2011 Hsu ...................... H04B 7/2606 455/13.1
2012/0053742 A1* 3/2012 Tsuda .................. B60L 11/1842 700/291
2012/0134395 A1 5/2012 Varadarajan et al.
2013/0111044 A1 5/2013 Cherian et al.
2013/0138989 A1* 5/2013 Jang .......................... G06F 1/28 713/340
2013/0188542 A1* 7/2013 Merlin .................. H04W 40/22 370/311
2014/0023053 A1 1/2014 Park et al.
2014/0044036 A1 2/2014 Kim et al.
2014/0056210 A1* 2/2014 Jafarian ................ H04W 88/04 370/315
2014/0056220 A1 2/2014 Poitau et al.
2014/0112162 A1* 4/2014 Tavildar ................ H04W 48/08 370/252
2015/0016359 A1 1/2015 Wang et al.
2015/0029866 A1 1/2015 Liao et al.
2015/0031353 A1 1/2015 Hakola et al.
2015/0038188 A1 2/2015 Gupta et al.
2015/0056987 A1 2/2015 Li et al.
2015/0121470 A1 4/2015 Rongo et al.
2015/0208332 A1 7/2015 Baghel et al.
2016/0270056 A1 9/2016 Gupta

OTHER PUBLICATIONS

Chuang Y-R., et al., "Study and Implementation of the Self-Organization Network Architectures in Smart Home Control Systems," 17th International Symposium on Consumer Electronics (ISLE), Jun. 3, 2013, pp. 79-80, XP032443881, DOI: 10.1109/ISCE.2013.6570262, ISBN: 978-1-4673-6198-9, Abstract pp. 1-2, figures 2,3,4.
International Search Report and Written Opinion—PCT/US2016/020049—ISA/EPO—dated Jun. 6, 2016.
Joo, S-S: "Proposed Resolution LBB5 CID284~287; 15-12-0565-00-004k-proposed-resolution-lb85-cid284-287," IEEE SA Mentor; 15-12-0565-00-004k-Proposed-Resolution-LB85-CID284-287, IEEE-SA Mentor, Piscataway, NJ USA, vol. 802.15.4k, Nov. 1, 2012, pp. 1-32, XP068042362, [retrieved on Nov. 1, 2012] pp. 1-29.
Second Written Opinion issued in PCT/US2016/020049 dated Dec. 14, 2016.

* cited by examiner

700

INTERNET OF EVERYTHING DEVICE RELAY DISCOVERY AND SELECTION

CROSS REFERENCE TO RELATED APPLICATIONS & PRIORITY CLAIM

The present application claims priority to and the benefit of the U.S. Provisional Patent Application No. 62/132,665, filed Mar. 13, 2015, which is hereby incorporated by reference in its entirety.

TECHNICAL FIELD

This application relates generally to wireless communication systems, and more particularly to relay discovery and selection by "internet of everything" (IoE) and other wireless communication devices.

INTRODUCTION

Sensors that can link to other sensors and computer systems continue to be embedded with more and more devices or objects, resulting in the "internet of everything" (also referred to as the "internet of things"). These devices can use a variety of wired and/or wireless communication technologies. The growth in connectivity results in machine-to-machine (M2M) or device-to-device (D2D) communications without the need for human intervention. Some examples of integration include devices that integrate sensors or meters to capture information that is then relayed to a remote system, such as a central server. This can include smart metering, temperature monitoring, pressure monitoring, fluid flow monitoring, inventory monitoring, water level monitoring, equipment monitoring, healthcare monitoring, wildlife monitoring, weather and geological event monitoring, fleet management and tracking, smart cities, smart driving scenarios, remote security sensing, physical access control, transaction-based business charging, and other applications.

Given their nature, these IoE devices are typically designed to consume low amounts of power and generally have low cost. For example, a sensor deployed in a gas meter (resulting in a "smart meter") may be expected to last years without replacement or recharge (if recharging is even possible). In contrast, a UE, such as a mobile device, has significantly more transmit power that, together with other features of the given UE, consume enough power that the UE is expected to be recharged every few days, if not daily or more frequently.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method for wireless communication is provided that includes receiving, at a first wireless communication device, discovery messages from one or more other wireless communication devices during a discovery time period; selecting, by the first wireless communication device, a relay device from among the one or more other wireless communication devices meeting data latency and energy parameters based on the received discovery messages; and associating, by the first wireless communication device, with the selected relay device during an association time period.

In an additional aspect of the disclosure, a method for wireless communication is provided that includes listening, by a first wireless communication device, for transmissions of one or more other wireless communication devices during a new broadcast time of slots of a discovery frame; broadcasting, by the first wireless communication device, a discovery message in a discovery slot of the discovery frame if no transmissions of the one or more other wireless communication devices are heard during the discovery slot; and associating, by the first wireless communication device, with a second wireless communication device during an association time period, wherein the second wireless communication device selected the first wireless communication device as a relay device based on the discovery message broadcast by the first wireless communication device during the discovery slot of the discovery frame.

In an additional aspect of the disclosure, a wireless communication device is provided that includes a sensor configured to generate data from a detected event; a transceiver configured to: receive discovery messages from one or more other wireless communication devices during a discovery time period; and transmit an association message to a selected relay device during an association time period; and a processor configured to select the relay device from among the one or more other wireless communication devices satisfying data latency and energy parameters based on the discovery messages received by the transceiver.

In an additional aspect of the disclosure, a wireless communication device is provided that includes a transceiver configured to: listen for transmissions of one or more other wireless communication devices during a new broadcast time of slots of a discovery frame; broadcast a discovery message in a discovery slot of the discovery frame if no transmissions of the one or more other wireless communication devices are heard during the discovery slot; and receive an association message from a second wireless communication device during an association time period, wherein the second wireless communication device selected the wireless communication device as a relay device based on the discovery message broadcast during the discovery slot of the discovery frame.

In an additional aspect of the disclosure, a wireless communication device is provided that includes means for receiving discovery messages from one or more other wireless communication devices during a discovery time period; means for selecting a relay device from among the one or more other wireless communication devices satisfying data latency and energy parameters based on the received discovery messages; and means for associating with the selected relay device during an association time period.

In an additional aspect of the disclosure, a wireless communication device is provided that includes means for listening for transmissions of one or more other wireless communication devices during a new broadcast time of slots of a discovery frame; means for broadcasting a discovery message in a discovery slot of the discovery frame if no transmissions of the one or more other wireless communication devices are heard during the discovery slot; and means for associating with a second wireless communication device during an association time period, wherein the second wireless communication device selected the wireless communication device as a relay device based on the discovery message broadcast by the means for broadcasting during the discovery slot of the discovery frame.

In an additional aspect of the disclosure, a computer readable medium having program code recorded thereon is provided that includes code causing a computer to perform one or more aspects of the methods described herein.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
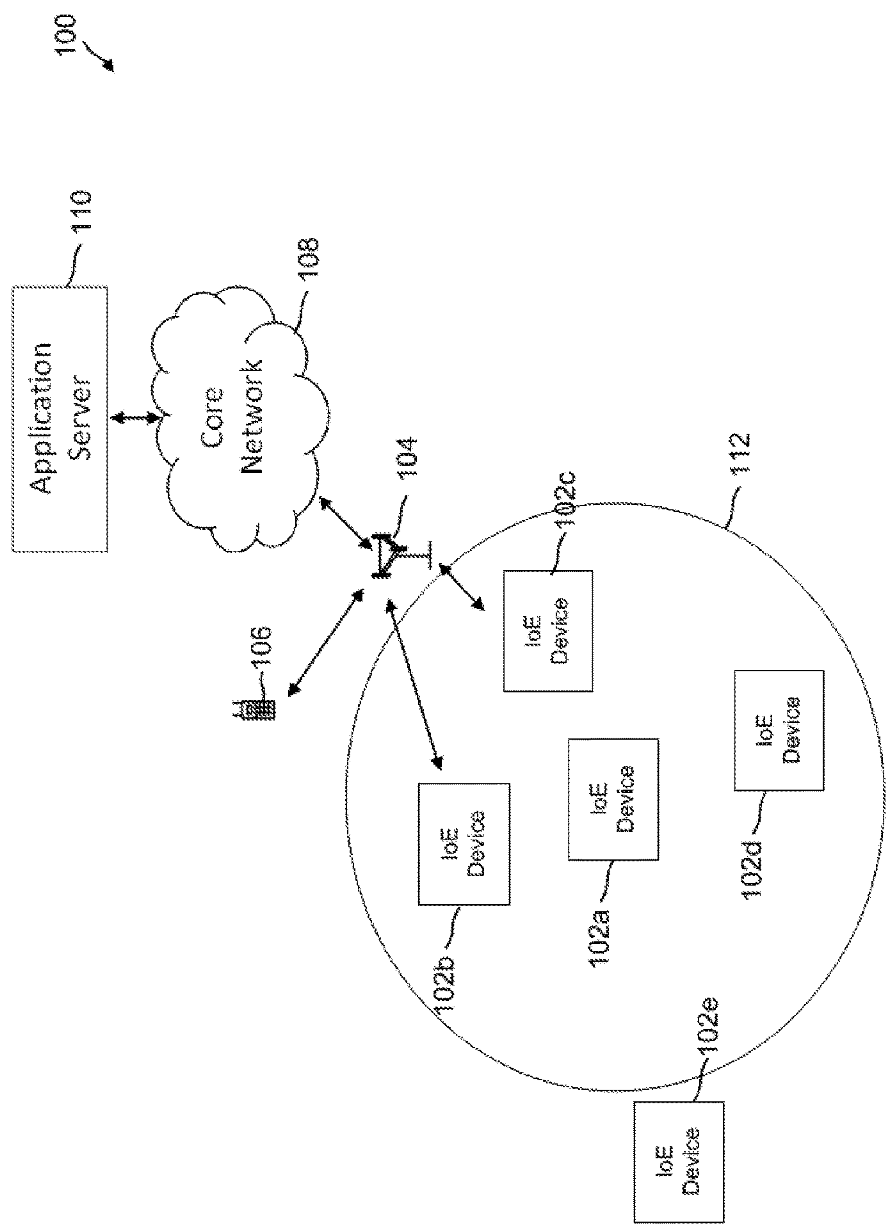
FIG. 1 is a diagram of an exemplary wireless communications environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms “network” and “system” are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named “3rd Generation Partnership Project” (3GPP). CDMA2000 and UMB are described in documents from an organization named “3rd Generation Partnership Project 2” (3GPP2). The techniques described herein may be used for the wireless networks and radio technologies mentioned above as well as other wireless networks and radio technologies, such as a next generation (e.g., $5^{th}$ Generation (5G)) network. Further, devices may also communicate with one another using various peer-to-peer technologies such as LTE-Direct (LTE-D), Bluetooth, Bluetooth Low Energy (BLE), ZigBee, radiofrequency identification (RFID), and/or other ad-hoc or mesh network technologies.

Internet of everything (IoE) devices are designed to periodically wake up to deliver their data to a central server or other device(s). However, some IoE devices can have significantly higher pathloss to the base station/gateway than other IoE devices. For example, this can be caused by severe shadowing and/or device placement (e.g., an IoE device in the basement of a building). Further, often IoE devices are expected to have little or no mobility, which means that IoE devices with higher pathloss can be stuck with it. Because of limited transmit power and/or pathloss due to shadowing and/or device placement, the battery life of the corresponding IoE devices can be significantly less than other devices in the network, requiring frequent battery replacement and/or degrading the network performance. As a result, there is a need for techniques to allow an IoE device to identify and select a relay device that limit the amount of power required from the IoE device to perform such functions.

Embodiments of the present disclosure introduce systems and techniques to enhance IoE device communications through relay discovery and selection. In some aspects the IoE devices synchronize timing from a wide area network (WAN) or other external source to derive common frames, sometimes referred to as discovery frames, in the IoE network. IoE devices with a good route to a base station/gateway (e.g., IoE devices with low pathloss to the base station) can broadcast information in these discovery frames that allow other IoE devices to discover them and select them as a relay, if appropriate. Discovery broadcast message from an IoE device can include information to allow a listening IoE device to select a suitable IoE device for relaying its data that satisfies latency constraints while minimizing the energy impact of relaying. Signaling structures are also provided to enable different IoE devices to select slots for broadcasting within the discovery frame in a distributed manner without disrupting existing periodic broadcasts.

FIG. 1 is a diagram of an exemplary wireless communications environment 100 according to embodiments of the present disclosure. The communications environment 100 may include a number of IoE devices 102*a*-102*e*, a number of base stations 104*a*, a core network 108, and one or more application servers 110.

The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

The base station 104 may include an evolved Node B (eNodeB or eNB), for example. A base station 104 may also be referred to as a base transceiver station, gateway, or an access point. FIG. 1 illustrates a single base station 104 for purposes of simplicity only. It will be recognized that there could be two or more base stations, as well as be an assortment of different types such as macro, pico, and/or femto base stations. The base stations 104 may communicate with the application server 110 via a backhaul such as core network 108. The base station 104 may also communicate with other base stations, directly or indirectly, such as via core network 108.

The IoE devices 102 may be dispersed throughout the communications environment 100, and each IoE device 102 may be stationary or mobile. FIG. 1 illustrates IoE devices 102*a*-102*e* for purposes of simplicity of illustration only. More or fewer may be deployed within the communications environment 100 as will be understood to those skilled in the relevant art(s). IoE devices 102*a*-102*e* may either be standalone or integrated within other devices. The IoE devices 102 may capture information that is then relayed to a remote system, such as application server 110 in FIG. 1. IoE devices 102 may have limited power resources because they are integrated with devices or objects, such as to render those devices or objects "smart," and need to be able to operate for long periods of time without replacement or recharge, e.g. days, weeks, months, or years. As a result, IoE devices 102 with limited transmit power, high pathloss, and/or other constraints may discover and utilize another IoE device 102 as a relay to the base station 104, as discussed in greater detail below, in order to decrease power consumption.

The wireless network 100 may also include one or more user equipments (UEs) 106 that may be dispersed throughout the wireless network 100 and can be either stationary or mobile. The UE 106 may also be referred to as a terminal, a mobile station, a subscriber unit, etc. The UE 106 may be a cellular phone, a smartphone, a personal digital assistant, a wireless modem, a laptop computer, an entertainment device, a tablet computer, an exercise/medical device, an industrial device, a vehicle/vehicular-component device, and many other wireless communication devices. In some implementations, a UE 106, another base station, an access point, or a gateway can serve as a relay to the base station 104 for a particular IoE device. In this regard, while the following description will focus on use of another IoE device serving as the relay, it is understood that the concepts are equally applicable to other types of wireless communication devices that can serve as a relay.

The application server 110 may be a central server that the IoE devices 102 are attempting to transmit data to for storage and/or analysis. The application server 110 may receive data as it is conveyed from the base station 104 from one or more of the IoE devices 102 and make use of information from the data and/or present it to one or more users that interact with the application server 110.

The base station 104 may have a sufficiently large coverage area that one or more of the IoE devices 102*a*-102*e* and/or UE 106 can receive data, from one or both of the base stations 104*a* and 104*b*, via a downlink. The downlink (or forward link) refers to the communication link from a base station 104 to the IoE devices 102 and/or UEs 106. Although capable of establishing a downlink with a base station 104, in some instances one or more of the IoE devices 102 may not have sufficient power to be able to establish an uplink to a base station 104. The uplink (or reverse link) refers to the communication link from an IoE device 102 (or a UE 106) to a base station 104. Further, in some instances an IoE device 102 may not be able to establish an uplink or a downlink connection with a base station 104. In such instances, the IoE device 102 may utilize communications with other IoE devices 102 and/or UEs 106 to facilitate indirect communication with a base station 104. Examples of such indirect communication approaches are described in U.S. patent application Ser. No. 14/107,195, filed Dec. 16, 2013 and titled "A HYBRID RELAY SCHEME," U.S. patent application Ser. No. 14/107,221, filed Dec. 16, 2013 and titled "RELAY SCHEME BETWEEN NARROW FREQUENCY BAND AND BROAD FREQUENCY BAND DEVICES," U.S. Provisional Patent Application No. 62/078,755, filed Nov. 12, 2014 and titled "OPPORTUNISTIC IOE MESSAGE DELIVERY VIA SENSOR-TRIGGERED FORWARDING," and/or U.S. Provisional Patent Application No. 62/078,711, filed Nov. 12, 2014 and titled "OPPORTUNISTIC IOE MESSAGE DELIVERY VIA WAN-TRIGGERED FORWARDING," each of which is expressly hereby incorporated by reference in its entirety.

In FIG. 1, IoE device 102*a* is shown as having a transmission range represented by area 112. As illustrated, area 112 does not reach base station 104. Accordingly, the IoE device 102*a* may be required to increase transmission power (if possible) in an effort to communicate directly with base station 104, which would adversely affect the power consumption and/or battery lifespan of IoE device 102*a*. In accordance with aspects of the present disclosure, the IoE device 102 can discover and select another IoE device (e.g., IoE device 102*b* or 102*c*) to utilize as a relay to communicate with base station 104 in a manner that conserves power and accounts for any latency parameters of the data to be communicated from IoE device 102*a* to base station 104.

IoE devices 102 can be capable of linking to or associating with each other, for example via D2D links. In some instances, the IoE devices 102 link to each other by sending out discovery messages and/or listening for discovery messages to determine what other IoE devices 102 may be within a neighboring vicinity and/or have sufficient operating parameters to serve as a relay to the base station 104. IoE devices 102 in the network 100 can be time-synchronized with the downlink of a WAN (e.g., cellular network), through either in-band or out-of-band signaling, either directly from the WAN or from a designated base station or gateway. The designated base station or gateway may provide coverage to all of the IoE devices 102 in the network 100 to facilitate synchronization of all of the IoE devices. In some implementations, the IoE devices 102 can utilize an external source (e.g., radio transmission of the UTC time by the NIST station in Fort Collins, Colo., or Global Positioning System timing) to derive a common timing for synchronizing discovery frames. Further, in some instances, the IoE device 102 may not be capable of receiving a WAN signal from the base station 104. For example, many IoE devices 102 are manufactured to be extremely low cost and, therefore, may not include WAN technology. Accordingly, in some implementations another IoE device 102, a UE 106, an access point, a gateway, and/or other wireless communication device can communicate timing information to the IoE device 102 using a specific radio protocol and on a channel associated with the IoE device 102 (e.g., WLAN, Bluetooth, ZigBee, etc.). Regardless of how the IoE device 102 receives the timing, the common timing can be used to send discovery broadcasts and/or listen for discovery broadcasts from the base station 104 and/or other IoE devices 102 at predetermined times and/or periodicity as described in greater detail below.

A newly introduced IoE device 102 to the network 100, or existing IoE device 102 looking for a relay, can utilize one or more discovery frames to learn about the base station 104 and/or other potential wireless communication devices (e.g., other IoE devices, UEs, access points, gateways, base stations, etc.) for relaying to the base station 104. By having a pre-determined, synchronized timing for discovery frames, an IoE device 102 can perform discovery with minimal energy expenditure by being in the power-save mode until one or more next discovery frames. Additional aspects of the discovery frame structure and timing are described below with respect to FIGS. 3-8.

Figure 2:
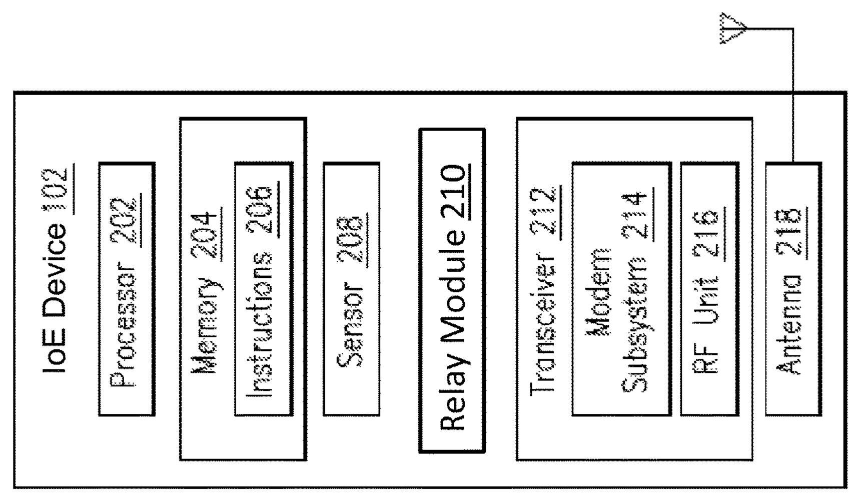
FIG. 2 is a block diagram of an exemplary IoE device according to embodiments of the present disclosure.

FIG. 2 is a block diagram of an exemplary IoE device 102 according to embodiments of the present disclosure. The IoE device 102 may have any one of many configurations for various IOE applications described above. The IoE device 102 may include a processor 202, a memory 204, a sensor 208, a relay module 210, a transceiver 212, and an antenna 218. These elements may be in direct or indirect communication with each other, for example via one or more buses.

The processor 202 may have a number of features. For example, the processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the IoE devices 102 introduced above with respect to FIG. 1 and discussed in more detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may have a number of characteristics. For example, the memory 204 include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the IoE device 102 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sensor 208 may be any sensor or meter capable of perceiving and capturing information about some aspect of its environment. This could include service metering (e.g., for gas utilities), temperature monitoring, pressure monitoring, fluid flow monitoring, inventory level monitoring, water level monitoring, equipment status monitoring, wildlife tracking, weather event monitoring, geological event monitoring, environmental monitoring, fleet tracking, and transaction-based business charging, to name just a few examples. Sensor 208 may send any information it captures as data to the transceiver 212 for transmission to a remote site, such as application server 110. Sensor 208 may also send any information it captures as data to the memory 204 for temporary or permanent storage.

The relay module 210 may be used to perform one or more of the various functions related to detecting and selecting a relay device in accordance with the present disclosure. For example, the relay module 210 may generate a discovery message for broadcasting by the IoE device 102. In this regard, the discovery message may include information to allow another IoE device 102 to determine whether the IoE device is suitable to serve as a relay. For example, the discovery message may include such information as the ID of the IoE device, the awake and/or transmission schedule of the device, current rate of energy consumption, remaining battery, energy required to transmit a packet of certain length(s), and/or other information. Similarly, the relay module 210 may analyze discovery messages received from other IoE devices 102, a base station 104, and/or UE 106 to determine whether the transmitting wireless communication device can serve as a relay for the IoE device 102. Exemplary techniques for evaluating and/or selecting a relay based on a received discovery message are described in greater detail below. In some instances, the relay module 210 may not be a separate component of the IoE device 102, but instead be defined by a combination of hardware, software, and/or firmware associated with other components or elements of the IoE device 102, such as the processor 202, memory 204, sensor 208, transceiver 212, and/or antenna 218.

The transceiver 212 may include a modem subsystem 214 and a radio frequency (RF) unit 216. The transceiver 212 is configured to communicate bi-directionally with other devices, such as other IoE device 102, base station 104, and/or UE 106. The modem subsystem 214 may be configured to modulate and/or encode the data from the sensor 208 and/or the relay module 210 according to a modulation and coding scheme (MCS), e.g., a low-density parity check (LDPC) coding scheme, a turbo coding scheme, a convolutional coding scheme, etc. The RF unit 216 may be configured to process (e.g., perform analog to digital conversion or digital to analog conversion, etc.) modulated/ encoded data from the modem subsystem 214 (on outbound transmissions) or of transmissions originating from another source such as another IoE device 102, a base station 104, or a UE 106. Although shown as integrated together in transceiver 212, the modem subsystem 214 and the RF unit 216 may be separate devices that are coupled together at the IoE device 102 to enable the IoE device 102 to communicate with other devices.

The RF unit 216 may provide the modulated and/or processed data, e.g. data packets (or, more generally, data messages which may contain one or more data packets and other information), to the antenna 218 for transmission to one or more other devices. This may include, for example, transmission of data messages to another IoE device 102 for relay to the base station 104, to a UE 106 for relay to the base station 104, or directly to the base station 104, according to embodiments of the present disclosure. The antenna 218 may further receive data messages transmitted from another IoE device 102, a base station 104, and/or UE 106 and provide the received data messages for processing and/or demodulation at the transceiver 212. Although FIG. 2 illustrates antenna 218 as a single antenna, antenna 218 may include multiple antennas of similar or different designs in order to sustain multiple transmission links.

It is understood that hardware, software, and/or firmware associated with various components or elements of the IoE device 102, such as the processor 202, memory 204, sensor 208, relay module 110, transceiver 212, and/or antenna 218 may be utilized individually and/or in combination to perform the various functions described herein. For example, in some implementations the transceiver 212 and/or antenna 218 are utilized to listen, receive, transmit, and/or broadcast signals, messages, and/or other information. Further, in some implementations the processor 202 and/or memory 204 are utilized to process, evaluate, filter, select, calculate, execute code, execute algorithms, and/or otherwise manipulate data/signals obtained by the IoE device (e.g., via sensor 208, transceiver 212, and/or antenna 218) in the context of the present disclosure.

Figure 3:
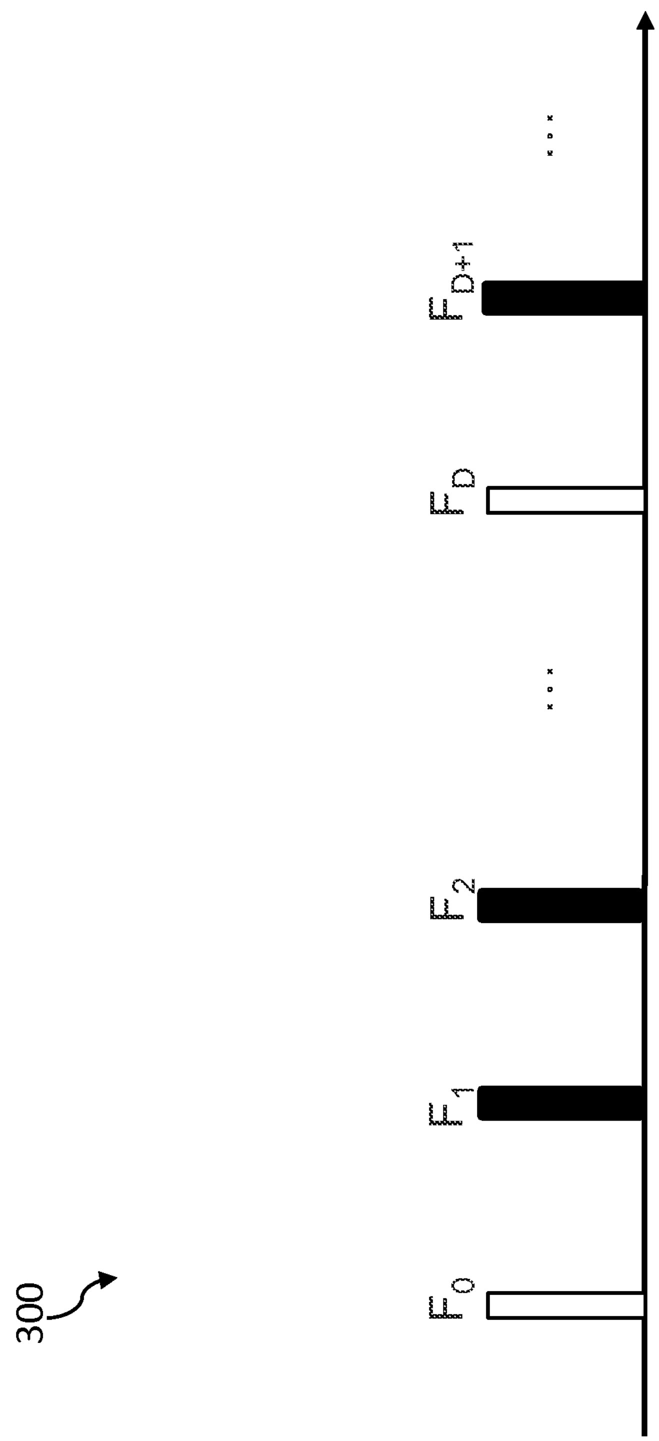
FIG. 3 is a diagram of a frame timeline illustrating a discovery frame spacing according to embodiments of the present disclosure.

FIG. 3 is a diagram of a frame timeline 300 illustrating a spacing between discovery frames according to embodiments of the present disclosure. As shown, discovery frames ($F_0$ and $F_D$) occur at pre-determined times and/or periodicity. The discovery frames ($F_0$ and $F_D$) may be sent at certain times (e.g., based on a reference clock), at certain time intervals (e.g., once per x minutes, hours, days, weeks, months, etc.), at certain frame intervals (e.g., every D frames in the illustrated embodiment), and/or other suitable timing technique. During the discovery frames ($F_0$ and $F_D$), each IoE device 102 in a position to act as a relay broadcasts a discovery message that includes information to allow other IoE devices to determine whether it is suitable to serve as a relay for that particular receiving IoE device. For example, the discovery message can include such information as a device ID, an awake schedule, a transmission schedule, a current rate of energy consumption, remaining battery power, the amount energy required to transmit a packet of certain length(s), and/or other information about the transmitting device.

Figure 4:
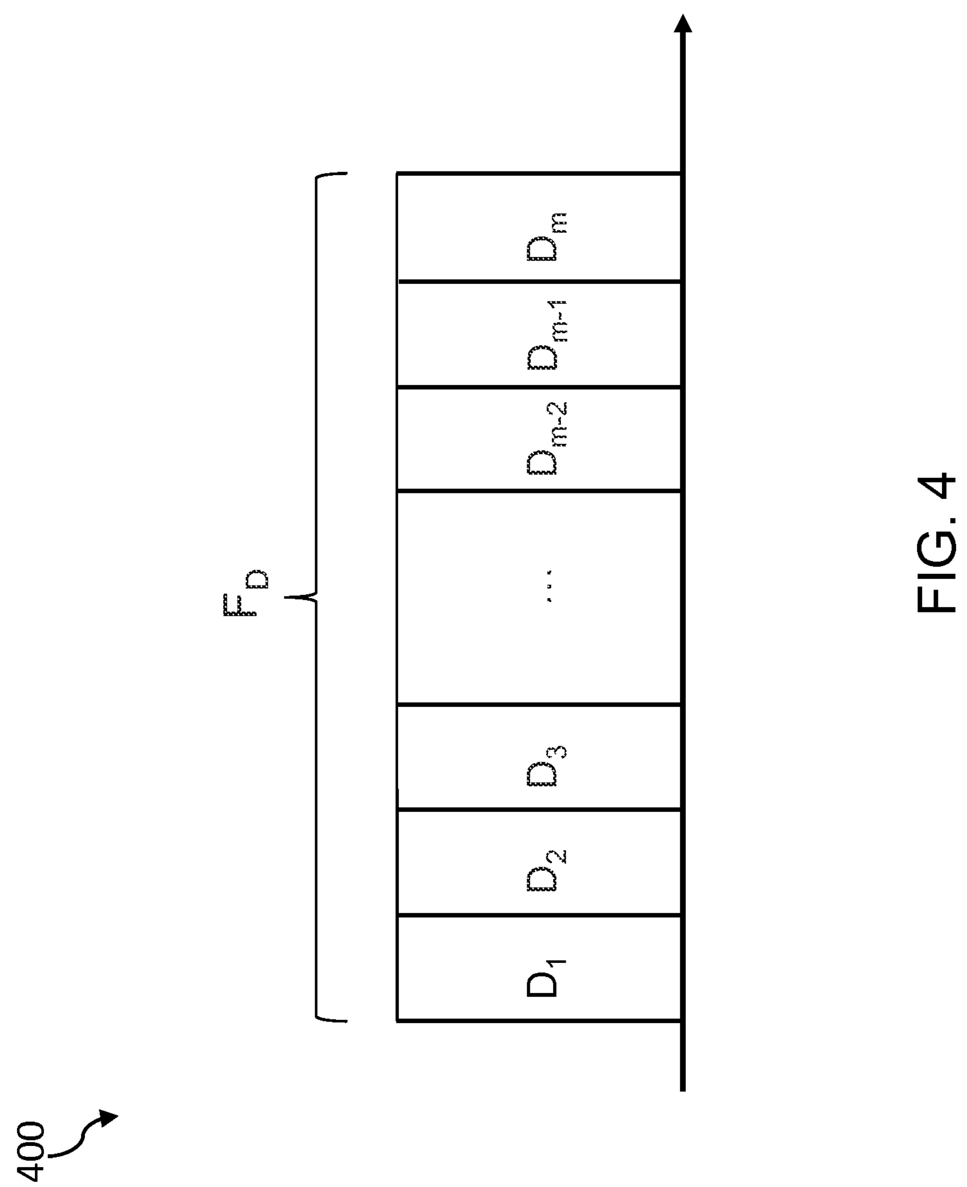
FIG. 4 is a diagram of a frame structure of a discovery frame according to embodiments of the present disclosure.

FIG. 4 is a diagram of a frame structure 400 of a discovery frame ($F_D$) according to embodiments of the present disclosure. As shown, the discovery frame ($F_D$) can be divided into a plurality of slots ($D_1$-$D_m$). In accordance with the present disclosure, each of the IoE devices 102 can select a particular slot in the discovery frame ($F_D$) to broadcast its discovery message without disrupting or interfering with the broadcasts from other IoE devices 102. In some instances, the IoE devices 102 utilize carrier sensing to identify a suitable slot ($D_1$-$D_m$) within the discovery frame ($F_D$) for broadcasting its discovery message.

Figure 5:
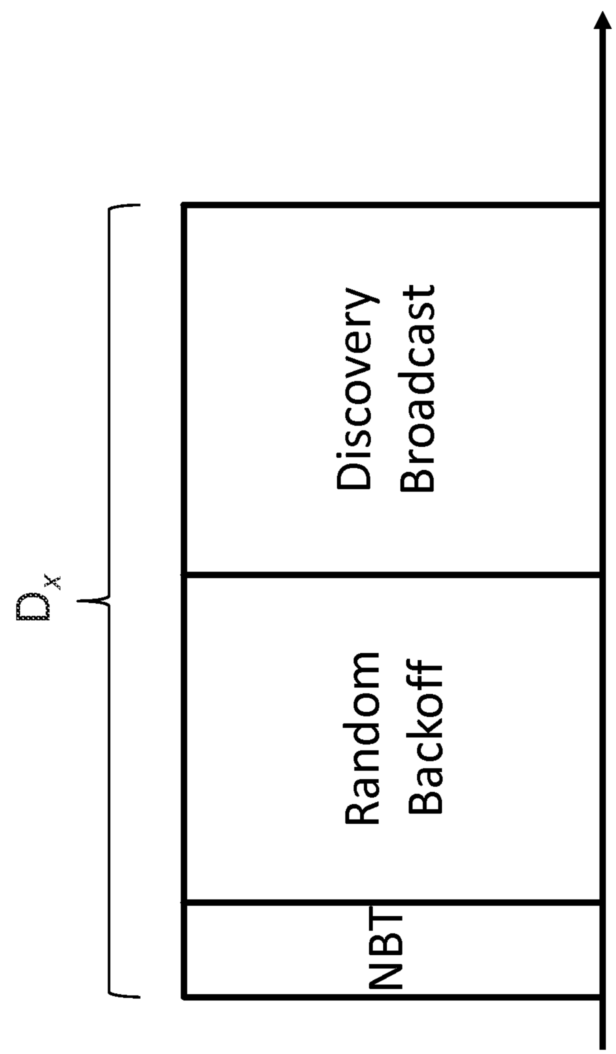
FIG. 5 is a diagram of a slot structure within a discovery frame according to embodiments of the present disclosure.

For example, FIG. 5 is a diagram of a slot structure 500 of a slot ($D_X$) within a discovery frame ($F_D$) according to embodiments of the present disclosure. As shown, during slot ($D_X$) an IoE device 102 can initially perform carrier-sensing during a new broadcast time (NBT). If the IoE device 102 senses a broadcast from another wireless communication device, such as another IoE device 102, during the NBT, then the IoE device will not transmit during the slot ($D_X$). The IoE device 102 can again perform carrier sensing during the NBT of a subsequent slot, which may be the next slot ($D_{X+1}$) or later slot ($D_{X+Y}$), and repeat this process for each subsequent slot until the IoE device 102 does not sense a broadcast from another device during a slot.

If the IoE device 102 does not sense a broadcast from another wireless communication device during the NBT, then the IoE device 102 will perform a backoff (i.e., listen for communications from other devices for an amount of time). The backoff period may be for a random (i.e., variable) or fixed amount of time. Where the backoff period is a random backoff, the length of the backoff may be selected by hardware and/or software of the wireless communication device. Again, if the IoE device 102 senses a broadcast from another wireless communication device during the random backoff period, then the IoE device will not transmit during the slot ($D_X$) and will proceed to monitoring the a subsequent slot, which may be the next slot ($D_{X+1}$) or later slot ($D_{X+Y}$). However, if the IoE device 102 does not sense a broadcast from another wireless communication device during the random backoff period, then the IoE device 102 will transmit its discovery message during the discovery broadcast period following the random backoff period, as shown. Accordingly, if two IoE devices 102 are simultaneously looking for a slot to broadcast in, the IoE device 102 with a longer random backoff period will defer to the IoE device 102 with the shorter random backoff period for the available slot. In this manner, the random backoff period can resolve contentions between competing IoE devices 102 looking for an available slot. In some implementations, a random backoff period is not included (or the random backoff time is set to zero) such that the IoE device 102 transmits its discovery message immediately following the NBT if a broadcast from another wireless communication device is not sensed during the NBT.

Once an IoE device 102 finds an available slot ($D_X$) for broadcasting its discovery message, it can continue to utilize that same slot in subsequent discovery frames ($F_D$) without needing to perform carrier sensing during the NBT or performing the random backoff. In this regard, any newly introduced IoE devices 102 or other IoE devices looking for a slot to transmit its discovery message will detect that the slot is occupied as a result of performing the carrier sensing and/or random backoff as described above. Accordingly, the IoE devices 102 can pick slots for their respective discovery broadcasts in a distributed manner without disrupting existing periodic broadcasts. In this regard, in some instances an IoE device 102 only broadcasts a discovery message if it meets threshold battery power, power consumption, path-loss, and/or other values indicative that the IoE device 102 is suitable to serve as a relay to other IoE devices. Accordingly, IoE devices 102 that do not meet such threshold value(s) may not broadcast a discovery message, but instead listen for broadcasts from other IoE devices 102 in an effort to discover and select a suitable device to serve as a relay to the base station 104.

Figure 6:
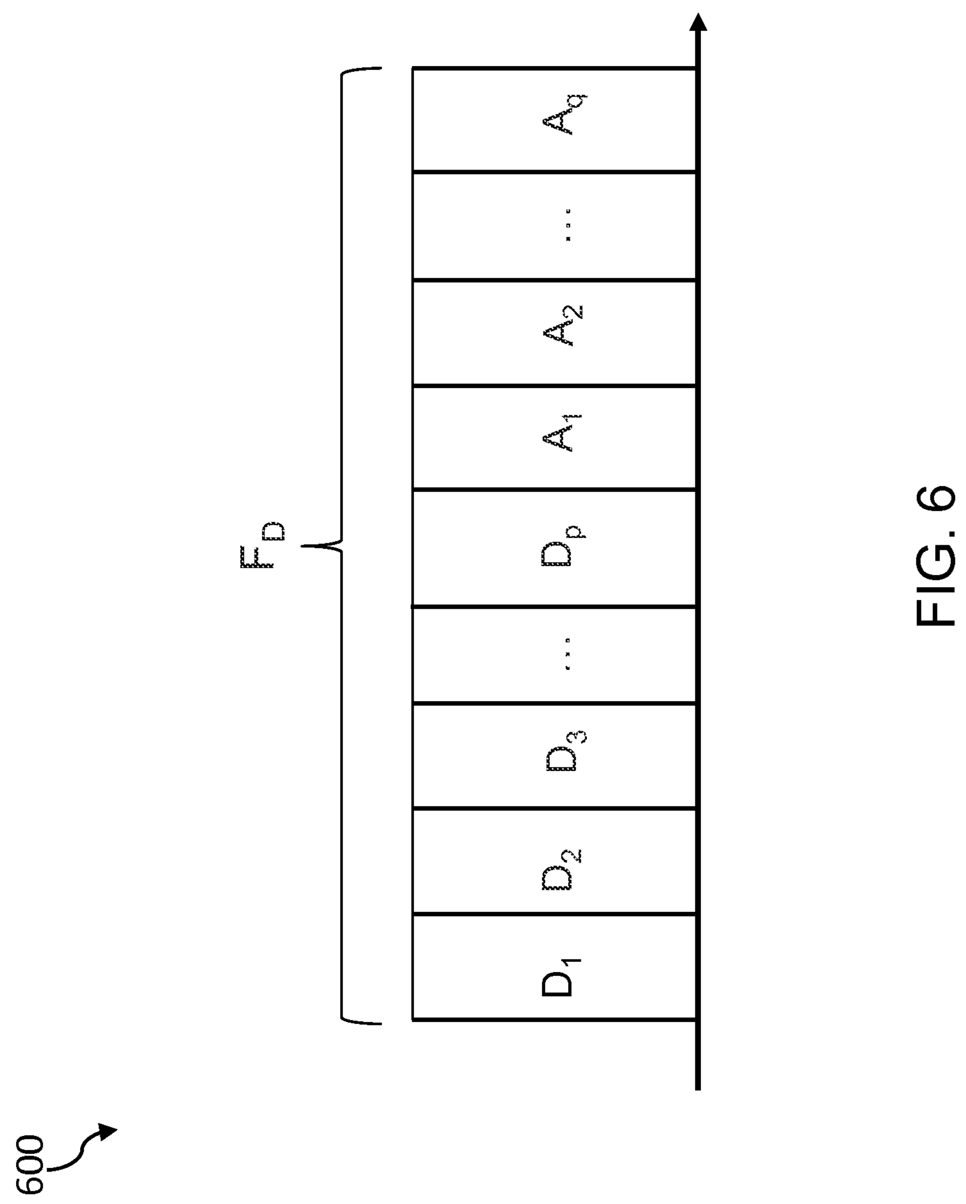
FIG. 6 is a diagram of a frame structure of a discovery frame that includes slots for discovery and association according to embodiments of the present disclosure.

FIG. 6 is a diagram of a frame structure 600 of a discovery frame ($F_D$) that includes discovery slots ($D_1$, $D_2$, $D_3$, . . . ) and association slots ($A_1$, $A_2$, $A_3$, . . . ) according to embodiments of the present disclosure. Instead of occupying the entire discovery frame ($F_D$) with time slots for discovery message broadcasts, one or more slots of the discovery frame ($F_D$) can be reserved for association between IoE devices 102. For example, during an association slot ($A_1$, $A_2$, $A_3$, . . . ) an IoE device 102 looking for a relay can associate with another IoE device 102 (or other wireless communication device) identified as being a suitable relay based on a discovery message received from the other IoE device 102 during one of the discovery slots ($D_1$, $D_2$, $D_3$, . . . ). Generally, the IoE devices 102 can utilize any known or future developed techniques for associating with one another. In some implementations, the IoE devices 102 utilize an RTS/CTS handshake to associate with one another. By having discovery slots ($D_1$, $D_2$, $D_3$, . . . ) and association slots ($A_1$, $A_2$, $A_3$, . . . ) within a single discovery frame ($F_D$), the latency of association is shortened. However, such an approach can result in higher contention resolution due to multiple IoE devices in an area looking to associate with the same relay device and/or different relay devices in the area.

Figure 7:
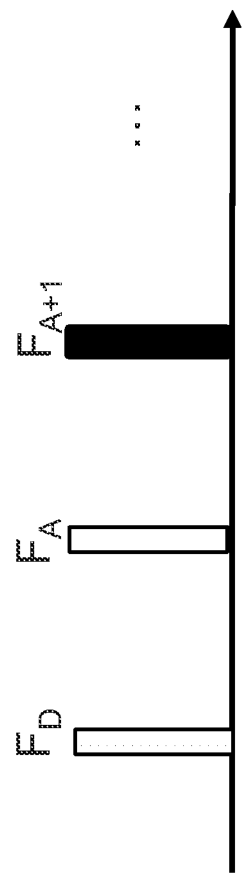
FIG. 7 is a diagram of a frame timeline illustrating timing between a discovery frame and an association frame according to embodiments of the present disclosure.
Figure 8:
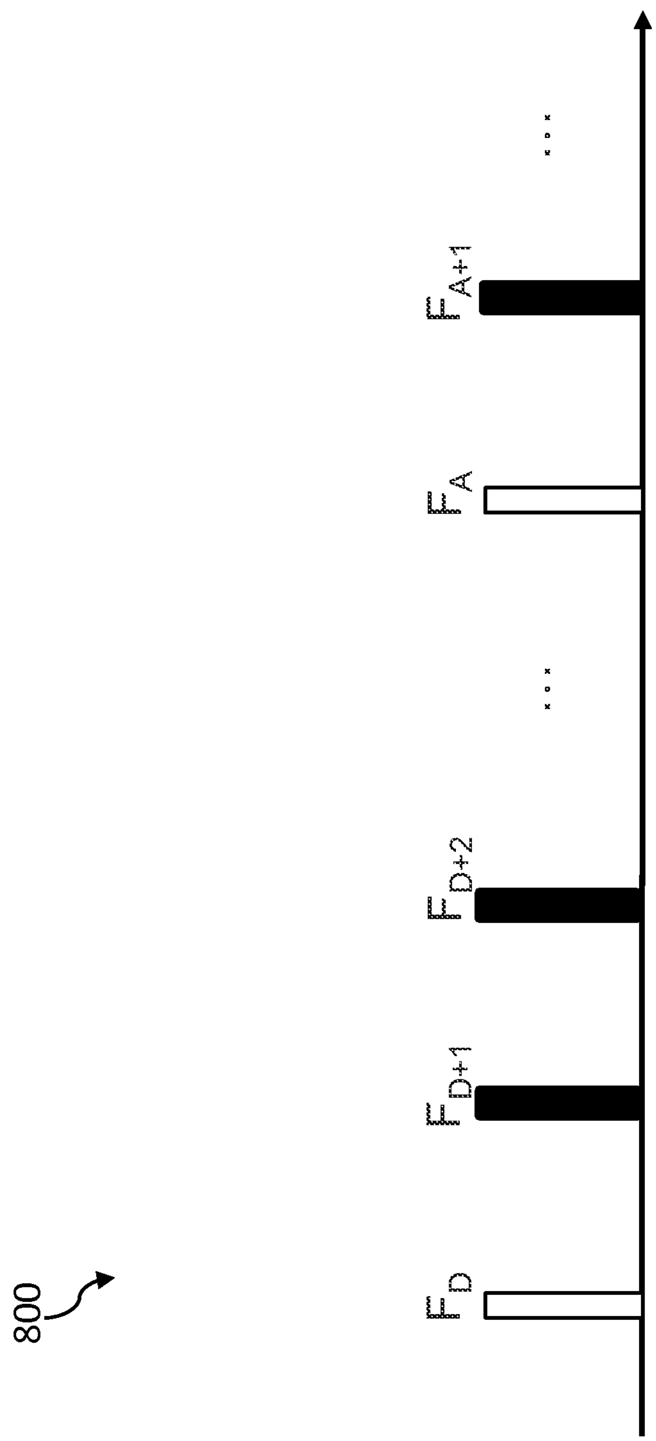
FIG. 8 is a diagram of a frame timeline illustrating timing between a discovery frame and an association frame according to embodiments of the present disclosure.

Referring now to FIGS. 7 and 8, shown therein are a frame timelines illustrating the association of IoE devices 102 being performed in a separate frame from the discovery frame. For example, FIG. 7 illustrates a frame timeline 700 showing an association frame ($F_A$) immediately following a discovery frame ($F_D$), while FIG. 8 illustrates a frame timeline 800 showing the association frame ($F_A$) spaced from the discovery frame ($F_D$) by one or more intervening frames. In the embodiments of FIGS. 7 and 8, all of the slots in the discovery frame ($F_D$) can be reserved for discovery broadcasts or all of the association slots ($A_1$, $A_2$, $A_3$, . . . ) of the discovery frame may have been utilized by other devices such that the association between the IoE devices occurs during a subsequent frame, indicating as an association frame ($F_A$). In this regard, the association frame ($F_A$) can be the immediately following frame (as shown in FIG. 7) or a subsequent frame (as shown in FIG. 8). In this regard, in some implementations the association frame ($F_A$) is selected based on when the IoE device identified as being suitable to serve as a relay is going to be awake next (e.g., as indicated in its awake schedule in the discovery broadcast), which may be seconds, minutes, hours, days, weeks, etc. following the discovery frame ($F_D$). This delayed association approach can significantly reduce contention between IoE devices for association time as compared to the single frame approach of FIG. 6 because different IoEs that may have competed for common association time slots may initiate association at different times based on the awake schedules of the different IoE devices that are to serve as relay nodes. However, this approach can result in higher association latency due to the delay between the discovery frame and the association frame.

The particular approach utilized for association between IoE devices 102 can be selected based on the particular goals or priorities of the network and/or the available functionalities of the IoE devices 102. For example, in some implementations low latency association between IoE devices 102 may be important such that a frame having both discovery slots and association slots is preferred. In other instances, avoiding contentions between IoE devices 102 may be important such that utilizing separate discovery frames and association frames are preferred.

In some instances, multiple IoE devices 102 may try to connect to the same relay IoE device. However, the relay IoE device 102 may not be able to handle serving as a relay for multiple devices and/or upon association with another IoE device the relay IoE device may no longer be the most suitable relay for a particular IoE device that has other relay options. Accordingly, in some implementations an IoE device 102 may broadcast an updated discovery message each time another IoE device associates with it. The updated discovery message can include updated information reflecting the effects of the IoE device serving as a relay. Similarly, an IoE device 102 may allow only one other IoE device to associate with it during any one discovery and association time period (whether within a single frame or across a discovery frame and an association frame) to prevent overload of a seemingly available IoE device 102. During its next discovery broadcast, the information included in the broadcast message will reflect the effects of the association with the one other IoE device from the previous discovery and association period.

As noted above, an IoE device 102 looking for a relay can detect and select a suitable relay device based on the discovery message(s) broadcast by other IoE devices 102 of the network 100. In some implementations, an IoE device 102 looking for a relay implements a distributed greedy approximation to identify an IoE device 102 to serve as a relay. For example, the IoE device 102 may identify the device within its transmission range that meets or satisfies any data latency parameters and will have the least energy load relative to remaining battery power to serve as a relay.

Referring again to FIG. 1, IoE device **102*a* may be looking for a suitable relay to facilitate communications with base station 104. Accordingly, the IoE device 102*a* may initially identify the other IoE devices 102 within its range. In this regard, the IoE devices 102 within range may be determined using any suitable technique, including based on pathloss (e.g., based on a comparison of a strength of a received pilot signal relative to the known transmission strength of the pilot signal). In FIG. 1, IoE device 102*e* is outside of the range 112 of IoE device 102*a*, while IoE devices 102*b*, 102*c*, and 102*d* are within the range 112 of IoE device 102*a***.

The IoE device **102*a* may also determine which of the IoE devices 102*b*, 102*c*, and 102*d* within its range 112 have a transmission schedule that meets a latency requirement of the data to be transmitted by the IoE device 102*a*. For example, if IoE device 102*d* does not have an awake period and/or transmission period scheduled within the time frame in which the IoE device 102*a* needs to transmit its data to the base station, then the IoE device 102*d* will not be suitable to serve as a relay. In some instances, the IoE device 102*a*** determines whether a particular IoE device meets its latency requirements based on the information (e.g., awake schedule, transmission schedule, etc.) included in the discovery message broadcast by that particular IoE device.

The IoE device **102*a* may also determine which of the IoE devices 102*b* and 102*c* that is within its range 112 and has a transmission schedule that meets its latency requirement will have the minimum energy load as a result of serving as a relay. In this regard, the IoE device 102*a*** may utilize the following formula to identify the IoE device that will have the minimum energy load when serving as a relay, $$\min_j(E_j(t-1)+E_{D2D\text{-}Rx}(ij)+E_{D\text{-}eNB}(j))/B_j \quad \text{(EQ. 1)}$$

where $E_j$ (t−1) is the existing rate of energy consumption at IoE device j (e.g., IoE device **102*b* or IoE device 102*c*), $E_{D2D\text{-}Rx}$ (ij) is the rate of energy consumption at IoE device j that would result from receiving periodic data from IoE device i (e.g., IoE device 102*a*), $E_{D\text{-}eNB}$ (j) is the rate of energy consumption for transmitting the data received from IoE i to the base station (e.g., base station 104), and $B_j$ is the remaining battery energy of IoE device j. Alternatively, the inverse of the ratio shown in EQ. 1, which corresponds to the projected battery lifetime IoE j, can be maximized to determine which IoE device should serve as a relay. Again, the IoE device 102***a* can determine which IoE device minimizes the energy load (or maximizes the battery life expectancy) based on the information (e.g., current rate of energy consumption, remaining battery, energy required to transmit a packet of certain length(s), etc.) included in the discovery messages broadcast by the IoE devices.

In some instances, the IoE device 102*a* determines or calculates a power savings, battery life, and/or other parameter associated with utilizing a relay as compared to a direct path communication to the base station 104. If using the relay does not provide at least a pre-specified improvement (e.g., meeting a threshold) over the direct path communication, then the IoE device 102*a* can maintain the direct path communication and not use the relay.

Once the IoE device 102*a* discovers and selects the optimum IoE device 102 (e.g., IoE device 102*c*) to serve as a relay, it associates with that IoE device 102*c* during an associate slot or association frame and subsequently utilizes the IoE device 102*c* as relay. In this regard, the IoE device 102*a* may continue to utilize the IoE device 102*c* as a relay indefinitely. Alternatively, the IoE device 102*a* may reevaluate every so often. In some instances, the amount of time between reevaluation and/or re-selection of a suitable relay is based at least in part on the expected/actual mobility of the IoE devices 102 of the network 100 and/or the variability in the number of IoE devices 102 that are part of the network 100. For example, where the IoE devices 102 are expected to be stationary and the number of IoE devices in the network is expected to remain constant (e.g., multiple smart meters in a building), then the IoE device 102*a* may go long periods of time (e.g., days, weeks, months, years, etc.) without reevaluating its relay connection. On the other hand, in networks where one or more of the IoE devices 102 is expected to be mobile and/or the number of IoE devices 102 is expected to change regularly (e.g., through the introduction and/or removal of IoE devices), then the IoE device 102*a* can reevaluate on a more frequent basis (e.g., months, weeks, days, minutes, etc.).

Figure 9:
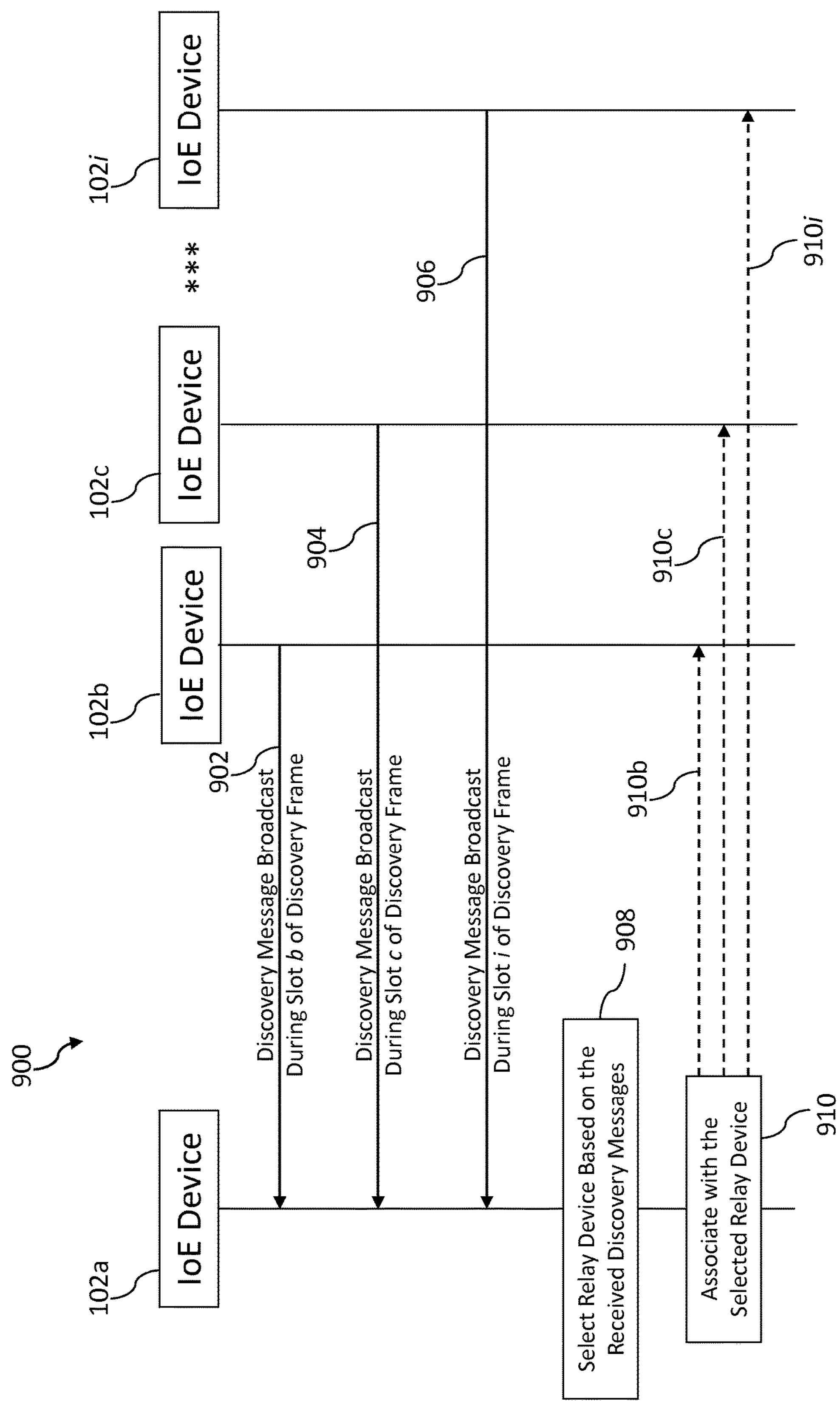
FIG. 9 is a diagram illustrating signaling between IoE devices for wireless communication relay selection in accordance with various aspects of the present disclosure.

FIG. 9 is a diagram illustrating signaling 900 between IoE devices for wireless communication relay selection in accordance with various aspects of the present disclosure. In particular, FIG. 9 shows signaling associated with an IoE device 102*a* selecting a relay device from a plurality of available IoE devices 102*b*, 102*c*, . . . , 102*i*. As shown, each of the IoE devices 102*b*, 102*c*, . . . , 102*i* broadcasts a discovery message during a different slot of a discovery frame. For example, IoE device 102*b* is shown broadcasting a discovery message 902 during slot b of a discovery frame, IoE device 102*c* is shown broadcasting a discovery message 904 during slot c of the discovery frame, and IoE device 102*i* is shown broadcasting a discovery message 906 during slot i of the discovery frame. It is understood that any number of IoE devices may broadcast discovery messages during the discovery frame. Each of the IoE devices 102*b*, 102*c*, . . . , 102*i* may select the particular slot during which it broadcasts its discovery message utilizing the various techniques described herein, including those described above with respect to FIG. 5 and below with respect to FIG. 11, as well as any other suitable techniques.

At action 908, the IoE device 102*a* selects a relay device from the plurality of available IoE devices 102*b*, 102*c*, . . . , 102*i* based on the received discovery messages 902, 904, . . . , 906. The IoE device 102*a* may select the relay device utilizing the various techniques described herein, including identifying the IoE devices that meet required range, latency, and/or energy parameters. Once the IoE device 102*a* has selected a relay device, the IoE device 102*a* associates with the selected relay device at action 910. For example, FIG. 9 shows associations 910*b*, 910*c*, and 910*i* for association with IoE devices 102*b*, 102*c*, and 102*i*, respectively. As noted above, the IoE devices can utilize any known or future developed techniques for associating with one another. Once associated, the IoE device 102*a* can utilize the selected relay device to communicate over the network.

Figure 10:
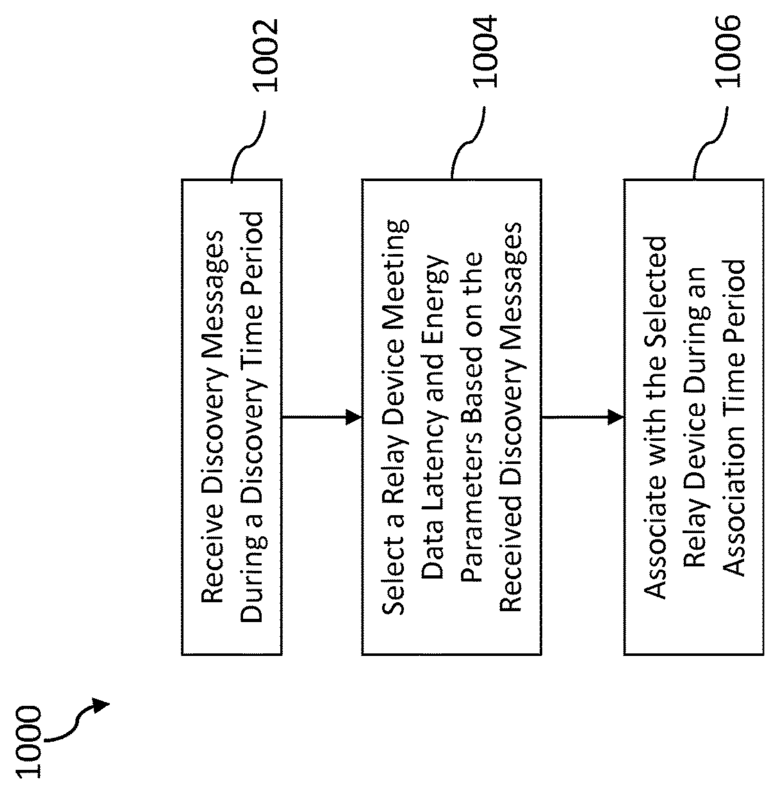
FIG. 10 is a flowchart illustrating an exemplary method for wireless communication in accordance with various aspects of the present disclosure.

FIG. 10 is a flowchart illustrating an exemplary method 1000 for wireless communication relay selection in accordance with various aspects of the present disclosure. In particular, the method 1000 illustrates the selection of a relay device from among a plurality of available relay devices according to embodiments of the present disclosure. The method 1000 may be implemented in an IoE device 102 (e.g., any discussed above with respect to FIGS. 1 and 2). It is understood that additional steps can be provided before, during, and after the steps of method 1000, and that some of the steps described can be replaced or eliminated from the method 1000.

At action 1002, a wireless communication device, such as an IoE device, receives a discovery message from one or more other wireless communication devices during a discovery time period. The discovery time period can be a discovery frame. The discovery messages may be received during separate slots of the discovery frame. The discovery messages may include one or more of an ID of the wireless communication device, an awake schedule of the wireless communication device, a transmission schedule of the wireless communication device, a current rate of energy consumption of the wireless communication device, a remaining battery life of the wireless communication device, and/or an amount energy required for the wireless communication device to transmit a data packet of a certain length.

At action 1004, the wireless communication device selects a relay device from among the one or more other wireless communication devices based on the received discovery messages. For example, the wireless communication device may select a device that meets range/proximity, data latency, energy, and/or other parameters. For example, the wireless communication device may identify the other wireless communication devices (i) within a certain range based on a pathloss between the wireless communication devices, (ii) satisfying a data latency requirement based on an awake schedule of the other wireless communication device; and/or (iii) satisfying and/or optimizing an energy parameter selected from the group of energy parameters consisting of an energy consumption or a battery life of the other wireless communication device.

At action 1006, the wireless communication device associates with the other wireless communication device selected to serve as the relay device. The association may occur during an association frame separate from the discovery frame or during at least one slot of the discovery frame. Once associated, the wireless communication device can utilize the relay device to communicate over the network.

Figure 11:
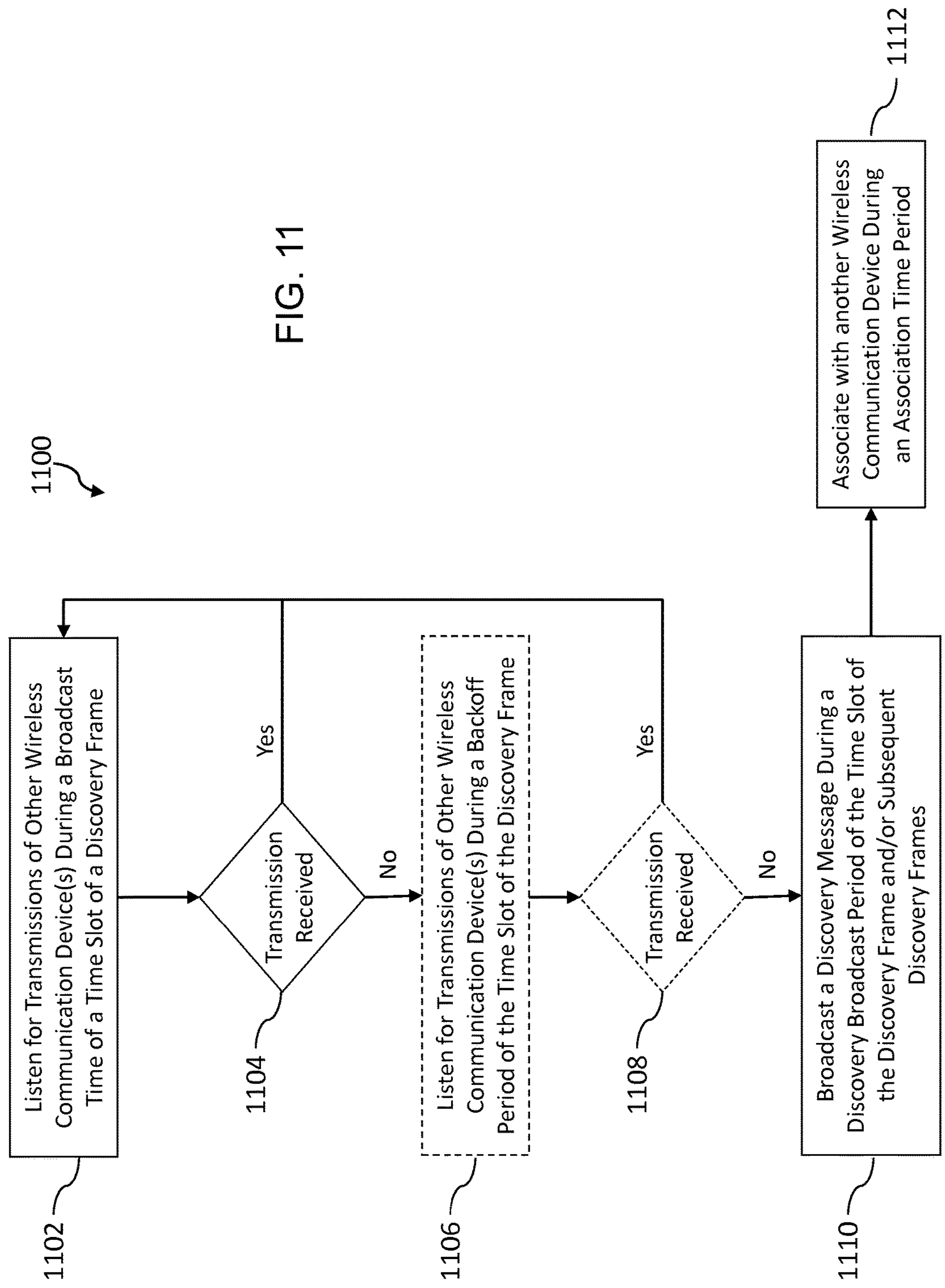
FIG. 11 is a flowchart illustrating an exemplary method for wireless communication in accordance with various aspects of the present disclosure.

FIG. 11 is a flowchart illustrating an exemplary method 1100 for wireless communication in accordance with various aspects of the present disclosure. In particular, the method 1100 illustrates the selection of a slot within a discovery frame for broadcasting discovery messages that may be utilized by other wireless communication devices for relay selection according to embodiments of the present disclosure. The method 1100 may be implemented in an IoE device 102 (e.g., any discussed above with respect to FIGS. 1 and 2). It is understood that additional steps can be provided before, during, and after the steps of method 1100, and that some of the steps described can be replaced or eliminated from the method 1100.

At action 1102, a wireless communication device, such as an IoE device, listens for transmissions of one or more other wireless communication devices during a broadcast time of a discovery slot of a discovery frame.

At action 1104, the wireless communication device determines if any transmissions were received during the broadcast time of the discovery slot. If a transmission was received, then the method returns to action 1102 and the wireless communication device listens for transmissions of one or more other wireless communication devices during a broadcast time of a discovery slot of a discovery frame, which may be a different discovery slot within the same discovery frame or a discovery slot within a different discovery frame. Accordingly, the wireless communication device may listen for transmissions from other wireless communication devices in a plurality of discovery slots within a single discovery frame.

If no transmission was received during the broadcast time, then the method continues to action 1106 where the wireless communication device listens for transmissions of one or more other wireless communication devices during a backoff period of the discovery slot of the discovery frame. The backoff period may immediately follow the broadcast time during which no transmissions were received. The backoff period may be for a random (i.e., variable) or fixed amount of time. Where the backoff period is a random backoff, the length of the backoff may be selected by hardware and/or software of the wireless communication device.

At action 1108, the wireless communication device determines if any transmissions were received during the backoff period of the discovery slot. If a transmission was received, then the method returns to action 1102 and the wireless communication device listens for transmissions of one or more other wireless communication devices during a broadcast time of a discovery slot of a discovery frame, which may be a different discovery slot within the same discovery frame or a discovery slot within a different discovery frame.

If no transmission was received during the backoff period, then the method continues to action 1110 where the wireless communication device broadcasts a discovery message during a discovery broadcast period of the time slot of the discovery frame. The discovery message broadcast by the may include one or more of an ID of the wireless communication device, an awake schedule of the wireless communication device, a transmission schedule of the wireless communication device, a current rate of energy consumption of the wireless communication device, a remaining battery life of the wireless communication device, and/or an amount energy required for the wireless communication device to transmit a data packet of a certain length. Further, in some instances the wireless communication device broadcasts a discovery message in a discovery slot of a subsequent discovery frame without listening for transmissions of other wireless communication devices in the subsequent discovery frame. In this regard, once the wireless communication device identifies an available discovery slot for broadcasting its discovery message, it can continue to broadcast during that same discovery slot of subsequent discovery frames.

At action 1112, the wireless communication device associates with another wireless communication device that selected it to serve as a relay device based on the broadcast discovery message(s). The association may occur during an association frame separate from the discovery frame or during at least one slot of the discovery frame. Once associated, the wireless communication device serves as relay device for the other wireless communication device to facilitate communications over the network.

In some instances, the method 1100 does not include actions 1106 and 1108 such that the wireless communication device proceeds to broadcasts a discovery message during a discovery broadcast period of the time slot of the discovery frame as long as no transmission is received during the broadcast time of the discovery slot.

Information and signals may be represented using any of a variety of different technologies and techniques in accordance with the present disclosure. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, the method comprising:

receiving, at a first wireless communication device, discovery messages from one or more other wireless communication devices during a discovery time period, the discovery messages comprising at least one energy consumption parameter and an awake schedule at the one or more other wireless communication devices;

determining, by the first wireless communication device, an energy loading at the one or more other wireless communication devices in response to the one or more other wireless communication devices serving as a relay device to the first wireless communication device based on the at least one energy consumption parameter and a data packet of the first wireless communication device to be received by the one or more other wireless communication devices;

selecting, by the first wireless communication device, a relay device from among the one or more other wireless communication devices based on the awake schedule at the one or more other wireless communication devices and a comparison of the determined energy loading with respect to at least one of an energy consumption value or a battery life value; and associating, by the first wireless communication device, with the selected relay device during an association time period.

2. The method of claim 1, further comprising receiving the discovery messages from the one or more other wireless communication devices during separate slots of the discovery time period.

3. The method of claim 2, wherein the association time period occupies at least one of:

an association frame separate from the discovery time period; or at least one slot of the discovery time period.

4. The method of claim 2, further comprising receiving the discovery messages that include at least one of an ID of the one or more other wireless communication devices, an awake schedule of the one or more other wireless communication devices, a transmission schedule of the one or more other wireless communication devices, a current rate of energy consumption of the one or more other wireless communication devices, a remaining battery life of the one or more other wireless communication devices, or an amount energy required for the one or more other wireless communication devices to transmit a data packet of a certain length.

5. The method of claim 1, further comprising identifying the one or more other wireless communication devices within a range of the first wireless communication device based on a pathloss between the first wireless communication device and the one or more other wireless communication devices.

6. The method of claim 1, further comprising selecting the association time period based on the awake schedule of the selected relay device.

7. The method of claim 1, further comprising identifying the one or more other wireless communication devices that optimize an energy parameter selected from a group of energy parameters consisting of an energy consumption of the one or more other wireless communication devices or a battery life of the one or more other wireless communication devices.

8. A wireless communication device, comprising:

a sensor configured to generate data from a detected event;

a transceiver configured to:

receive discovery messages from one or more other wireless communication devices during a discovery time period, the discovery messages comprising at least one energy consumption parameter and an awake schedule at the one or more other wireless communication devices; and transmit an association message to a selected relay device during an association time period; and a processor configured to:

determine an energy loading at the one or more other wireless communication devices in response to the one or more other wireless communication devices serving as a relay device to the wireless communication device based on the at least one energy consumption parameter and a data packet of the wireless communication device to be received by the one or more other wireless communication devices; and select the relay device from among the one or more other wireless communication devices based on the awake schedule at the one or more other wireless communication devices and a comparison of the determined energy loading with respect to at least one an energy consumption value or a battery life value.

9. The wireless communication device of claim 8, wherein the discovery time period is a discovery frame and wherein the transceiver is configured to receive the discovery messages during separate slots of the discovery frame.

10. The wireless communication device of claim 8, wherein the association time period occupies at least one of:

an association frame separate from the discovery time period; or at least one slot of the discovery time period.

11. The wireless communication device of claim 8, wherein the processor is configured to select the relay device by identifying the one or more other wireless communication devices within a range of the wireless communication device by calculating a pathloss between the wireless communication device and the one or more other wireless communication devices.

12. The wireless communication device of claim 8, wherein the processor is further configured to select the association time period based on the awake schedule of the relay device.

13. The wireless communication device of claim 8, wherein the processor is further configured to select the relay device by identifying the relay device from among the one or more other wireless communication devices that optimizes an energy parameter selected from a group of energy parameters consisting of an energy consumption of the other wireless communication devices or a battery life of the other wireless communication devices.

14. The wireless communication device of claim 8, wherein the discovery messages received by the transceiver include at least one of an ID of the one or more other wireless communication devices, an awake schedule of the one or more other wireless communication devices, a transmission schedule of the one or more other wireless communication devices, a current rate of energy consumption of the one or more other wireless communication devices, a remaining battery life of the one or more other wireless communication devices, or an amount energy required for the one or more other wireless communication devices to transmit a data packet of a certain length.

* * * * *